(12) United States Patent
Schlegel (10) Patent No.: US 8,698,011 B2
(45) Date of Patent: Apr. 15, 2014

(54) DEVICE FOR FIXING A CABLE TO A CABLE OUTLET CONNECTOR

(75) Inventor: Bernard Schlegel, Rahden (DE)

(73) Assignee: Harting Electric GmbH & Co. KG, Espelkamp (DE)

( * ) Notice: Subject to any disclaimer, the term of this patent is extended or adjusted under 35 U.S.C. 154(b) by 50 days.

(21) Appl. No.: 13/577,758

(22) PCT Filed: May 3, 2011

(86) PCT No.: PCT/DE2011/075096
§ 371 (c)(1),
(2), (4) Date: Aug. 8, 2012

(87) PCT Pub. No.: WO2012/010168
PCT Pub. Date: Jan. 26, 2012

(65) Prior Publication Data
US 2012/0325549 A1    Dec. 27, 2012

(30) Foreign Application Priority Data
Jul. 17, 2010   (DE) .......................... 10 2010 027 445

(51) Int. Cl.
*H02G 3/18* (2006.01)
(52) U.S. Cl.
USPC ........... 174/652; 174/655; 174/660; 174/662; 439/604; 277/606; 248/56
(58) Field of Classification Search
USPC ......... 174/652, 653, 655, 660, 662, 135, 664; 277/606; 248/56; 439/604, 583, 584, 439/462

See application file for complete search history.

(56) References Cited

U.S. PATENT DOCUMENTS

| 4,169,967 | A | | 10/1979 | Bachle |
| 4,436,265 | A | | 3/1984 | Simon |
| 5,350,204 | A | | 9/1994 | Henniger |
| 5,763,832 | A | * | 6/1998 | Anselm .......................... 174/669 |
| 5,920,035 | A | * | 7/1999 | Haney et al. ................... 174/652 |
| 7,183,486 | B2 | * | 2/2007 | Pyron et al. ..................... 174/59 |
| 7,465,888 | B2 | * | 12/2008 | Fischer et al. ................. 174/655 |

FOREIGN PATENT DOCUMENTS

| DE | 27 50 713 | 5/1979 |
| DE | 30 18 119 | 11/1981 |
| DE | 31 05 316 | 9/1982 |
| DE | 31 28 541 | 2/1983 |
| DE | 195 26 927 | 1/1997 |
| DE | 198 34 680 | 2/2000 |
| EP | 0 627 588 | 12/1994 |
| EP | 2 083 492 | 7/2009 |
| GB | 2 102 637 | 2/1983 |

* cited by examiner

*Primary Examiner* — Dhirubhai R Patel
(74) *Attorney, Agent, or Firm* — Jacobson Holman PLLC (57) ABSTRACT

A device for fixing a cable to a cable outlet connector, including a clamping sleeve, a spring element and a locking ring, whereby the spring element is in the form of an open ring whose ends are clamped between a supporting contour of the clamping sleeve and a driving contour of the locking ring, while the spring element is variable in diameter by means of a relative movement of the locking ring with respect to the clamping sleeve.

7 Claims, 10 Drawing Sheets

DEVICE FOR FIXING A CABLE TO A CABLE OUTLET CONNECTOR

CROSS-REFERENCE TO RELATED APPLICATIONS

This application is a nationalization of PCT/DE11/075096 filed May 3, 2011, and published in German.

DESCRIPTION

The invention relates to a device for fixing a cable to a cable outlet connector consisting of a clamping sleeve, a spring element and a locking ring.

Such a device for securing a cable to a cable outlet connector is required to securely hold cables against torsional and tensile forces at: cable outlets of connector housings, enclosures, or the like.

PRIOR ART

DE 27 50 713 discloses a cable gland with strain relief, for example, for an electrical device. The strain relief for the cable to be connected is effected by two substantially cylindrical parts that are inserted into one another and through which the cable is guided. Each of the parts has an oval grommet initially lying above one another. The relative rotation of the individual parts with respect to one another also causes the oval grommets to rotate with respect to one another so that the remaining resultant opening is narrowed to the cable diameter.

DE 31 05 316 A1 discloses a cable gland with strain relief for a connector. In this case, the cable strain relief is provided by a clamping band that is designed essentially as an open ring that conforms to the inner diameter of the cable outlet connector. An element integral with the clamping band can be introduced in a radial direction in the connector, whereby the clamping band is narrowed to the cable sheath.

DE 195 26 927 A1 discloses a cable outlet. The cable is encapsulated by a sealing grommet to seal against media, whereby the grommet is fixed on a support plate at the cable outlet.

DE 198 34 680 A1 proposes cable strain relief by enclosing the cable in a sleeve that enlarges the cable diameter. Inside the cable, the cable is then fed into a cone-shaped cable passage whose diameter decreases towards the outside. Thus, the cable cannot be pulled out.

EP 0 627 588 B1 discloses a cable gland for securing a cable to a cable outlet connector. The connector is provided with individual flexible clamping tongues, which are pressed against a seal over the cable sheath by the screwing of a union nut thus simultaneously clamping the seal and the cable.

On pressing the clamping tongues together, it may occur that the pressure exerted on the cable via the seal does not achieve the required level to securely hold the cable against torsional and tensile forces.

DE 3 128 541 C1 discloses a cable gland that provides a cable strain relief clamp for strain relief along with a safeguard against inadvertent release. However, the cable gland here requires special tools.

THE OBJECTIVE

The object of the invention is to provide a cable clamp (strain relief) that can be assembled without special tools while providing good security for the cable against torsional and tensile forces.

The object is inventively achieved in that the spring element is formed as an open ring whose ends are clamped between a supporting contour of the clamping sleeve and a driving contour of the locking ring, whereby the spring element is variable in diameter as a result of a relative movement of the locking ring with respect to the clamping sleeve.

Advantageous embodiments of the invention are specified in the subclaims.

A cable strain relief and sealing system is usually integrated into a cable fixing element such as a cable gland. The cable gland consists essentially of a clamping sleeve, a spring element and a locking ring that fix a cable to a cable outlet connector of a connector housing along with the cable strain relief and sealing system. The cable can, for example, be multicore.

The cable strain relief and sealing system consists of a strain relief element and a sealing element. The strain relief element is substantially shaped like a spiral spring and therefore has a helical structure. The word "helical" in common usage can also be equated with the word "spiral." On one side, the strain relief element is connected to the sealing element. The strain relief element and the sealing element together form a functional unit that is also referred to as the operative connection.

The sealing element is disc-shaped and has a central opening whose diameter is smaller than the diameter of the cable to be connected.

Optionally, the sealing element may also be provided with a so-called push-through membrane instead of the opening.

The side of the sealing element that is directed in the cable outlet direction (the outer side) is provided at the edge with concentrically arranged lamellae, i.e. so-called pressing lamellae. The opposite side (the inner side) of the sealing element also has lamellae, i.e. so-called sealing lamellae, which surround the opening for the cable to be connected. The sealing lamellae are arranged concentrically around the opening of the sealing element that is provided for the cable. During installation, the cable is pushed through the strain relief element and through the openings of the sealing element and the clamping sleeve.

Often, the sealing element is made of material having elastomeric properties (such as EPDM, NBR, PU, etc.). In this case, the lamellae are already formed in the manufacturing process. The inner sealing lamellae ensure an improved sealing function between the sealing element and the cable sleeve. The outer pressing lamellae of the sealing element increase the sealing effect between the clamping sleeve and the cable outlet connector.

The locking ring simultaneously encloses both the clamping sleeve and the cable outlet connector. A contour is formed on the inside of both the clamping sleeve and the locking ring and an annular spring element is inserted between the contours.

The locking ring is rotatable around the cable outlet connector and the clamping sleeve. Upon rotation of the locking ring, i.e. on a relative movement of the locking ring with respect to the clamping sleeve, the relative distance between the above-mentioned contours changes with respect to one another. As the spring element is clamped between these contours, the diameter of the spring element is thereby changed.

The direction of rotation of the locking ring that causes the diameter of the spring element to increase is called the opening direction. In the final position (also called the stop position), this rotation causes the spring element to reach its maximum diameter. Rotation in the opposite direction, the so-called locking direction, causes the diameter of the spring element to decrease until the diameter is minimal in a second end position.

When no force is exerted on the spring element via the above-mentioned contours, the spring element is in its so-called neutral position.

As mentioned above, the cable is introduced into the opening of the funnel-shaped clamping sleeve before the assembly of the cable fixing device. At the same time, it is enclosed by the spiral-shaped strain relief element and the related sealing element. The clamping sleeve is surrounded at the bottom by the locking ring. Subsequently, the clamping sleeve is positioned on the cable outlet connector so that the locking ring also encloses the upper portion of the cable outlet connector.

As already described in detail, the spring element is clamped between the supporting contour of the clamping sleeve and the driving contour of the locking ring.

The spring element is conically-shaped inside. The cable outlet connector contains a circumferential groove into which the conically-shaped spring element is inserted when the locking ring is rotated in the locking direction. When the end position of the locking direction is reached, the conically-shaped inner side of the spring element fits exactly into the circumferential groove of the cable outlet connector. Thus, the clamping sleeve surrounding the cable is held or fixed on the cable outlet connector.

In a particularly advantageous embodiment, the spring element is already engaged in the circumferential groove of the cable outlet connector in its neutral position. In order to fix the clamping sleeve on the cable outlet connector, it can simply be pushed onto the cable outlet connector. The spring element initially moves slightly radially back and then snaps into the circumferential groove.

A surface of the supporting contour of the clamping sleeve and a surface of the driving contour of the locking ring are each inclined (at an acute angle) to a surface that subtends a radial vector with an axial vector of the clamping sleeve. These are surfaces that are directed towards the respective ends of the clamped spring element. The ends of the spring element are appropriately aligned diagonally opposite to them. In this way, the ends of the spring element slide radially outwards upon rotation of the locking ring in the opening direction. On the other hand, on rotation in the opposite locking direction, the ends of the spring element are guided radially inwards. This ensures that the diameter of the spring element changes uniformly. The ring shape is always maintained.

In a plan view of the clamping sleeve, the supporting contour forms a substantially right-angled triangle whose hypotenuse is the above-mentioned slope that serves for the radial guidance of the spring element upon rotation of the clamping ring. The same applies to the geometry of the driving contour of the locking ring.

The clamping sleeve comprises elongated webs that are directed radially outwards within a plane. On assembly of the clamping sleeve and locking ring, these webs are introduced into axial recesses of the locking ring. These recesses are enclosed by inner webs of the locking ring. The webs of the clamping sleeve and the locking ring are arranged obliquely to one another when viewed in the plane of the direction of assembly. On relative movement of the locking ring with respect to the clamping sleeve, i.e. during the rotational movement of the locking ring, both webs are pressed against one another so that the parts (clamping sleeve and locking ring) are clamped to one another. This clamping is also referred to as a bayonet coupling.

When the webs are clamped, the end position of the locking direction is also reached and the spring element engages in the circumferential groove of the cable outlet connector.

The clamping sleeve partly surrounds the sheathed surface of the cable outlet connector. A circumferential ledge is formed inside the clamping sleeve. The sealing element is arranged between this ledge and the boundary of the cable outlet connector.

On clamping of the locking ring with the clamping sleeve and the simultaneous fixing of the clamping sleeve on the cable outlet connector, the sealing element is clamped between the above mentioned circumferential edge of the clamping sleeve and the boundary of the cable outlet connector.

The conical inner shape of the spring element thus supports the clamping force by means of which the clamping sleeve is drawn slightly down onto the cable outlet connector.

The inner circumferential edge of the clamping sleeve exerts a force on the pressing lamellae of the sealing element. The pressing lamellae on the circumference reduce the contact surface dimension between the inner circumferential edge of the clamping sleeve and the sealing element. Thus, a higher pressure is exerted on the seal for the same pressing force.

When the webs are clamped i.e. when they are completely separated, then the end position of the opening direction is reached and the spring element is at a maximum diameter. Now the clamping sleeve is removable from the cable outlet connector.

From the cable outlet connector, the cable is enclosed by the strain relief element. The strain relief element comprises contours at a first end that are insertable into recesses of the cable outlet connector. In this way, the strain relief element is rotatably fixed about its axial axis at this end.

The strain relief element includes radially outwardly facing latching hooks at a second end. These latching hooks engage in corresponding latching contours of the cable outlet connector so that the second end of the strain relief element is non-rotatably fixed in one direction. Rotation in the other direction slides the flexible latching hooks to the latching contours.

In addition, the strain relief element at the second end has driving hooks facing axially outwards. The clamping sleeve includes matching driving contours inside. On relative movement of the clamping sleeve with respect to the strain relief element in a first direction, i.e. the so-called clamping direction, the second end of the strain relief element that is fixed in the cable outlet connector is moved or rotated with respect to the first end.

The driving contours are arranged in a circle around the cable opening inside the clamping sleeve. The neighboring driving contours are offset from one another in the radial direction. One could also say that the driving contours run counterclockwise radially outwards along their direction of extension.

As a result, the helical structure of the strain relief element can be lashed around the cable sheath. This will be described later in more detail.

The driving contours of the clamping sleeve are so shaped that during a relative movement of the clamping sleeve with respect to the strain relief element in a second direction, i.e. opposite to the clamping direction the driving hooks of the strain relief element slide along to the driving contours of the clamping sleeve without a force being exerted on the driving hooks that would be sufficient to cause a relative rotation of the ends of the strain relief element. The driving hooks are made of an elastically deformable material and give way slightly in the radial direction as necessary.

As already described above, the strain relief element is spirally or helically shaped between its two ends. This spiral structure surrounds the cable sheath of the cable to be connected. By the above-described relative movement of the two ends of the strain relief element with respect to one another, the pitch of the helical structure is changed. The radius of helix increases or decreases accordingly.

With decreasing radius, the cable is constricted and fixed by the spiral or helical shape of the strain relief element. Strain relief is thus ensured for the cable.

By a relative back and forth movement of the clamping sleeve with respect to the cable outlet connector, the helical or spiral shaped portion of the strain relief element is tightened around the cable sleeve.

The latching hooks of the strain relief element are carried forward in a rotational direction (the clamping direction) of the clamping sleeve, and the helical structure narrows around the cable sheath. In the other rotational direction, the driving hooks slide off the driving contours of the clamping sleeve. The device thus acts as a so-called ratchet.

In an advantageous embodiment, the strain relief element has a first and a second spiral-shaped structure. The structures are arranged opposite one another, i.e. one is right-handed and the other is left-handed. This kind of double helix ensures the constricted cable sheath is always centered, i.e. aligned along the axial axis of the strain relief element.

BRIEF DESCRIPTION OF THE DRAWINGS

An example of an embodiment according to the invention is shown in the drawings and will be explained in more detail below. In the drawings.

DETAILED DESCRIPTION OF THE PREFERRED EMBODIMENTS

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

FIGS. 1a, 1b, 1c, and 1d show the individual components of the device 1 for fixing a clamping sleeve 2 to a cable outlet connector 30. The cable is not shown in this illustration to aid clarity.

The fixing of the clamping sleeve 2 enclosing the cable on the cable outlet connector is described first, independently of the fixing of the cable in the clamping sleeve 2 itself. A second part of the description covers the strain relief of the cable and sealing of the cable fixing device against media such as dust and water.

The clamping sleeve 2 (FIG. 1b) has a substantially funnel-shaped form. The clamping sleeve 2 includes a downwardly tapered cable outlet opening 5. Radially elongated webs 4 facing outwards are formed on the locking side. A supporting contour 3 extends in the axial direction in the vicinity of these webs 4. This supporting contour has substantially the form of a triangle extruded into space, a so-called triangular column with a side surface 3a.

The locking ring 20 (FIG. 1a) is of substantially cylindrical shape. The opening is narrowed at one end by a bottom ring 24 arranged radially. A driving contour 21 is formed at the bottom ring 24. Geometrically, the shape of the driving contour 21 substantially corresponds to the shape of the supporting contour 3 of the clamping sleeve 2.

Figure 1:
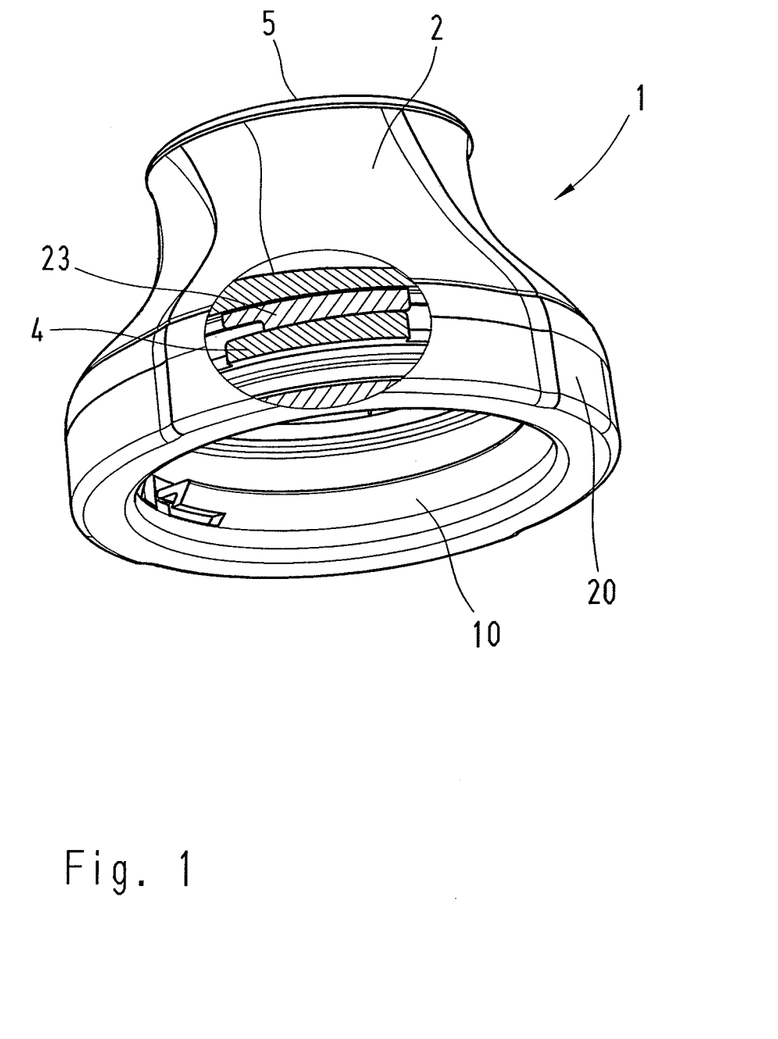
FIG. 1 perspective drawing of the device for fixing the cable to a cable outlet cornice without strain relief, FIG. 1a a perspective view of the locking ring, FIG. 1b a perspective view of the clamping sleeve, FIG. 1c a perspective view of the spring element, FIG. 1d a plan view of the spring element shown in FIG. 1c, FIG. 2 a perspective view of the cable outlet connector, FIG. 3 a cross-sectional view of the device for fixing the cable to the cable outlet connector, FIG. 4 an exploded view of the device for fixing the cable to a cable outlet connector, FIG. 5 a perspective view of the strain relief element in a double helix embodiment, FIG. 6a a perspective view of the strain relief element with associated sealing element, FIG. 6b a plan view of the sealing element, FIG. 7 a cutaway view of the device for fixing the cable to a cable outlet connector with strain relief and FIG. 8 an exploded view of the device for fixing the cable to a cable outlet connector with strain relief.
Figure 1A:
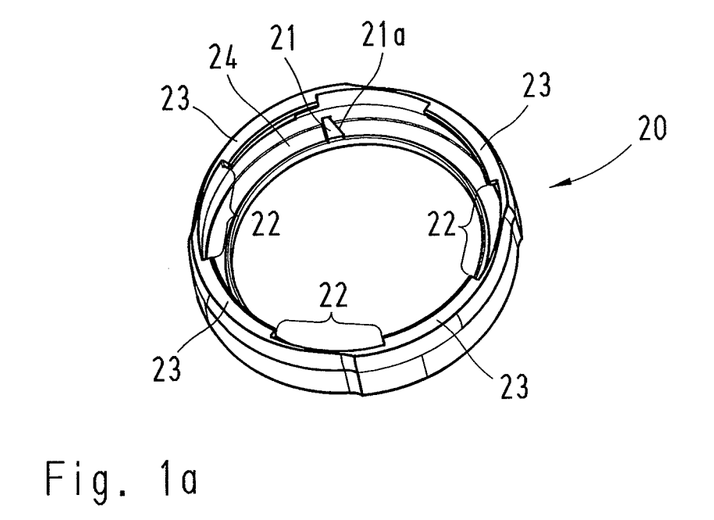
Figure 1B:
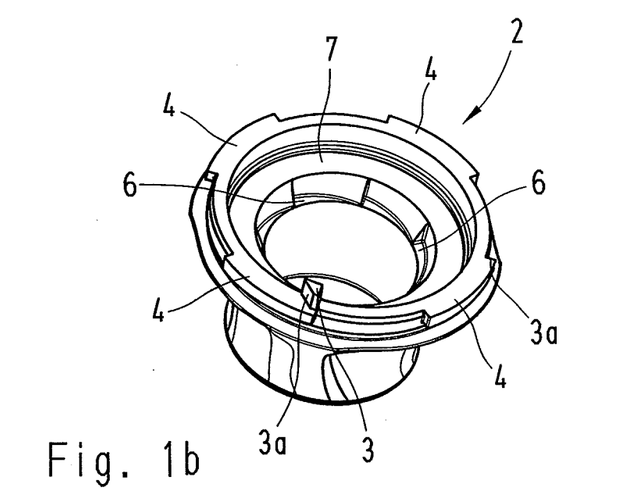

Elongated webs 23 are formed integrally at the opposite end of the locking ring 20 and are separated from one another by recesses 22. The webs 4 of the clamping sleeve 2 are inserted into the recesses 22 of the locking ring 20.

The spring element 10 (FIG. 1c and FIG. 1d) has substantially the shape of an open ring, whereby the spring element 10 is tapered inwards. One end of the spring element 10 is built in two stages 11a, 11b. The ends 11b, 12 of the spring element 10 are tensioned between the surface 3a of the supporting contour 3 of the clamping sleeve 2 and the surface 21a of the driving contour 21 of the locking ring 20.

Figure 1C:
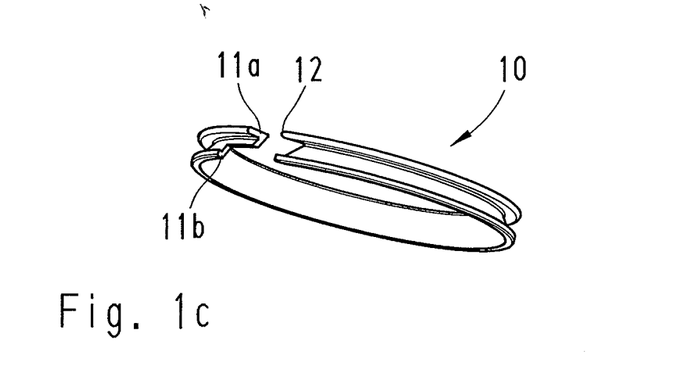
Figure 1D:
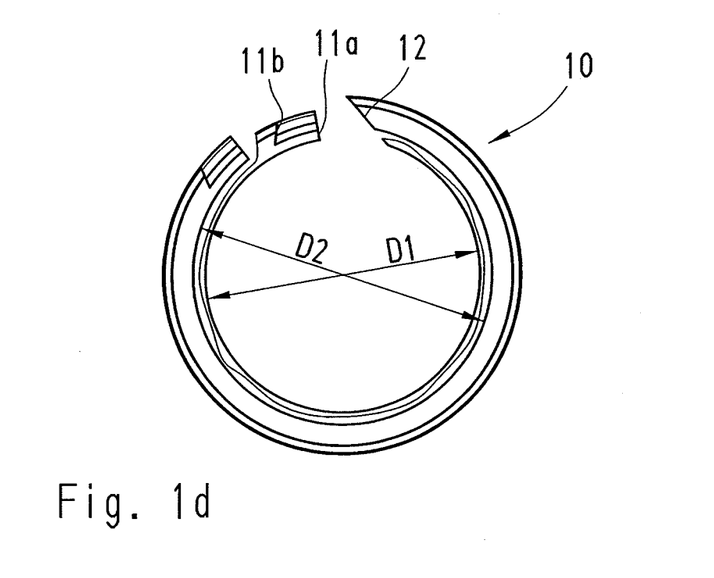

On a relative movement of the locking ring 20 with respect to the clamping sleeve 2, the distance between the driving contour 21 with respect to the supporting contour 3 changes. This causes the spring element 10 to expand so that the diameter D changes depending on the rotational direction of the locking ring 20. Upon rotation of the locking ring 20 to the fully clockwise position (in the locking direction), the diameter of the spring element 10 becomes a minimum D1. At the same time, the webs 4 and 23 slide over one another and clamp the clamping sleeve 2 with the locking ring 20 according to the bayonet principle. On rotation of the locking ring 20 in the opposite direction (in the opening direction), the diameter of the spring element 10 becomes a maximum D2 while the webs 4 and 23 are no longer positioned one above the other, so that the clamping sleeve 2 can be removed from the locking ring 20.

Figure 2:
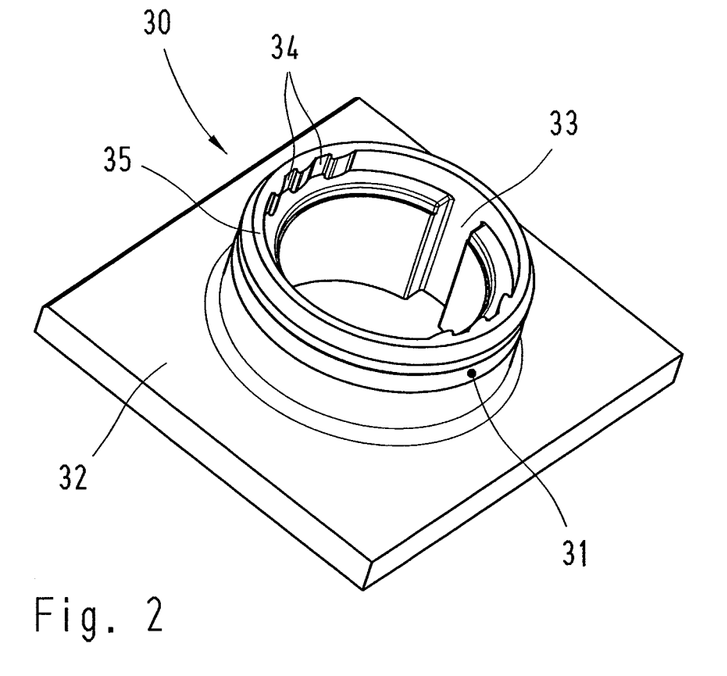

The cable outlet connector 30 (FIG. 2) is essentially cylindrical in shape and usually forms part of a connector housing (not shown). There is a circumferential groove 31 in the outer surface of the cable outlet connector 30 running parallel to the base surface 32.

Figure 3:
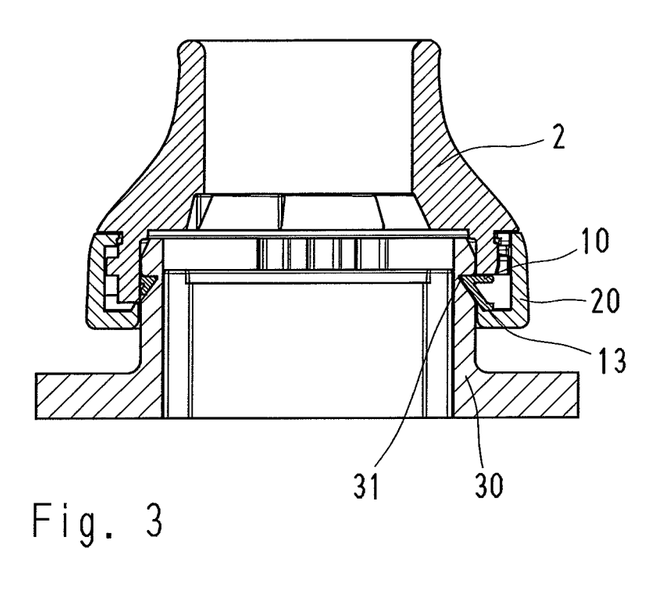

The locking ring 20 surrounds both the clamping sleeve 2 and the cable outlet connector 30 (FIG. 3). Rotation of the locking ring 20 into the end position in the locking direction causes the conical shaped inner side of the spring element 10 to fit into the circumferential groove 31 of the cable outlet connector 30. In this way, the clamping sleeve 2 is fixed on the cable outlet connector 30.

On entry into the circumferential groove 31, the inner conical shape of the spring element 10 causes the clamping sleeve 2 to be drawn slightly downwards in the direction of the cable outlet connector. The spring element 10 has a slanted ledge 13 on the outer side that serves to center the spring element 10 in the locking ring 20.

Figure 4:
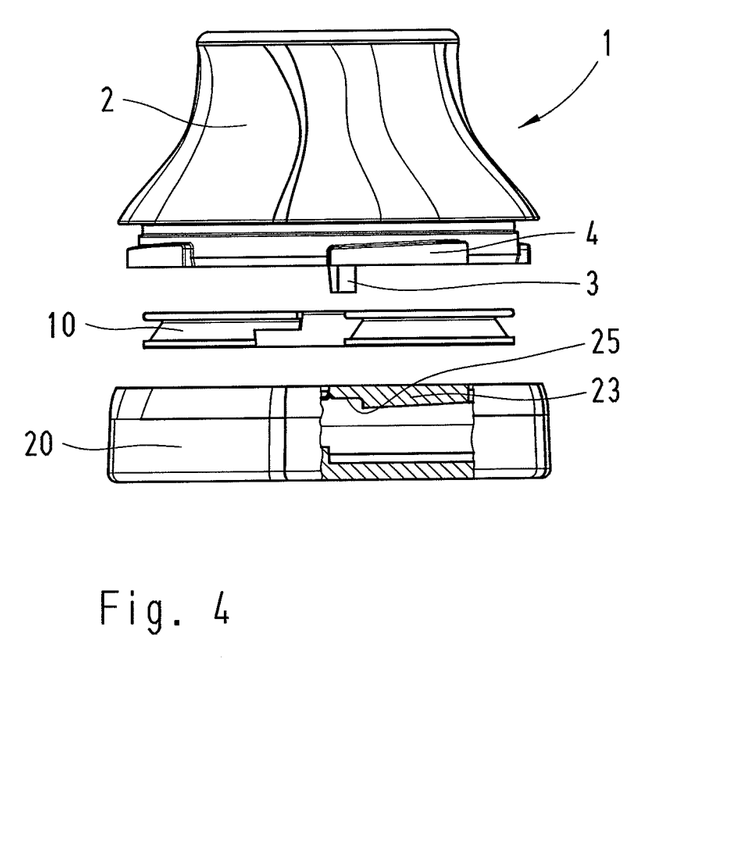

FIG. 4 shows an exploded view of the components, i.e. clamping sleeve, spring element and locking ring, that are suitable for fixing the clamping sleeve in the cable outlet connector through the above-mentioned operative connection. The locking ring 20 is shown in a partial sectional view. Thus, the contour 25 that fixes or supports the spring element 10 can be seen.

As mentioned above, one will now deal with the strain relief of the cable and the sealing of the cable fixing device against media such as dust and water.

Figure 5:
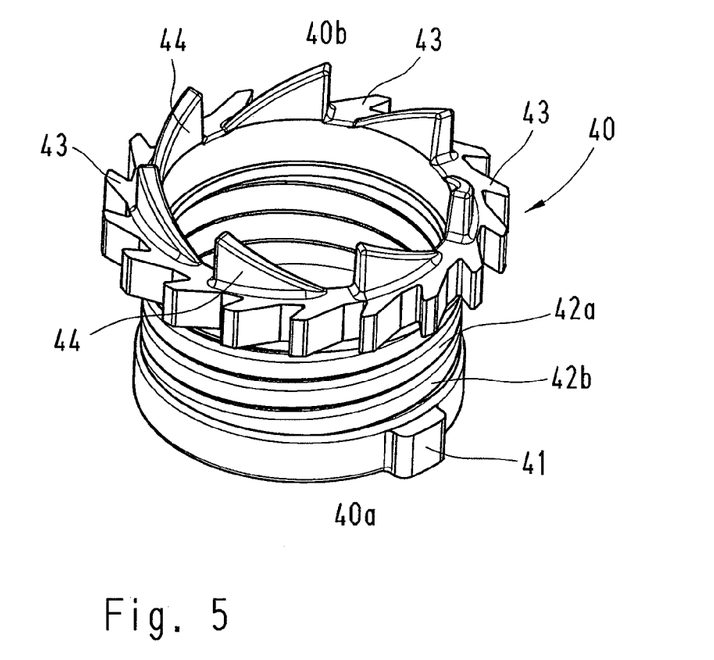

The strain relief element 40 (FIG. 5) consists essentially of end-side rings which are connected together by a helical or spiral-shaped structure 42. FIG. 5 shows a strain relief element 40 with a double helix structure. This means that there is simultaneously a left- and a right-handed structure between the ends 40a, 40b. This leads to a better centering of the cable in the strain relief element 40.

Contours 41 facing radially outwards are provided at the first end 40a of the strain relief element 40 and are inserted in matching recesses 33 of the cable outlet connector 30. Thus, the first end 40a of the strain relief element 40 is fixed against rotation in the cable outlet connector 30.

At the second end 40b, the strain relief element 40 has latching hooks 43 facing radially outwards. They engage with latching contours 34 in the upper part of the cable outlet connector 30 so that the end 40b can also be fixed against rotation.

In addition, at the second end 40b of the strain relief element 40 there are driving hooks 44 facing axially upwards that cooperate with driving contours 6 of the clamping sleeve 2. The driving hooks 44 have essentially a sawtooth shape. By rotating the clamping sleeve (relative to the cable outlet connector) in the direction of the falling edge of the driving hooks 44, the second end 40b of the strain relief element 40 moves relative to the first end 40a and thus narrows the spiral structure between the ends 40a, 40b. A cable led between the ends is clamped and thus a strain relief is created for the cable.

On rotation of the clamping sleeve 2 against the falling edge of the driving hooks 44, the driving hooks 44 slide off the driving contours 6 of the clamping sleeve 2. The ends 40a, 40b are not moved relative to each other.

A back and forth movement of the clamping sleeve 2 causes the helical or spiral structure—acting like a ratchet—to be lashed around the cable sheath of the cable to be connected. It requires no additional tools.

Figure 6A:
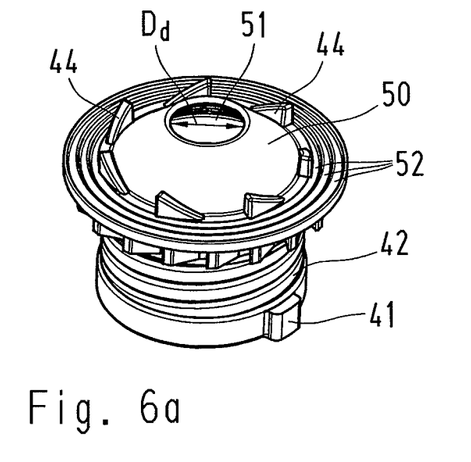
Figure 6B:
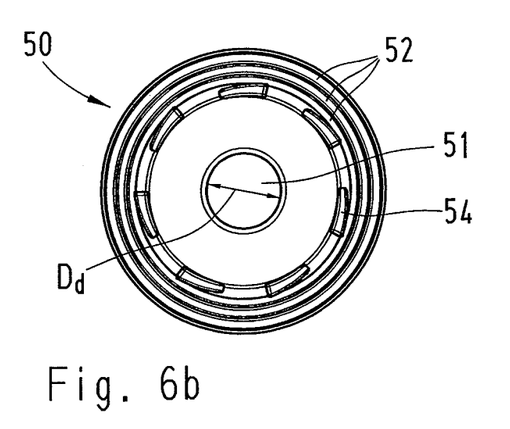

The second end 40b of the strain relief element 40 is connected with the sealing element 50 (FIG. 6a, FIG. 6b). In this case, the driving hooks 44 protrude through holes 54. The cable to be connected is passed through the opening 51 of the sealing element 50. The diameter Dd of this opening is smaller than the diameter of the cable to be connected.

The sealing element 50 has pressing lamellae 52 on the outside. These provide sufficient sealing pressure on the cable outlet connector 30.

The clamping sleeve 2 surrounds in part the outer surface of the cable outlet connector 30. A circumferential ledge 7 is formed inside the clamping sleeve 2. In the assembled state of the device 1 (FIG. 7), the sealing element 50 is arranged between this ledge 7 and the boundary 35 of the cable outlet connector 30.

The inner sealing lamellae 53 along the opening 51 reinforce the material density of the elastomer and thereby increase the contact pressure (tightness) against the cable sleeve.

Figure 7:
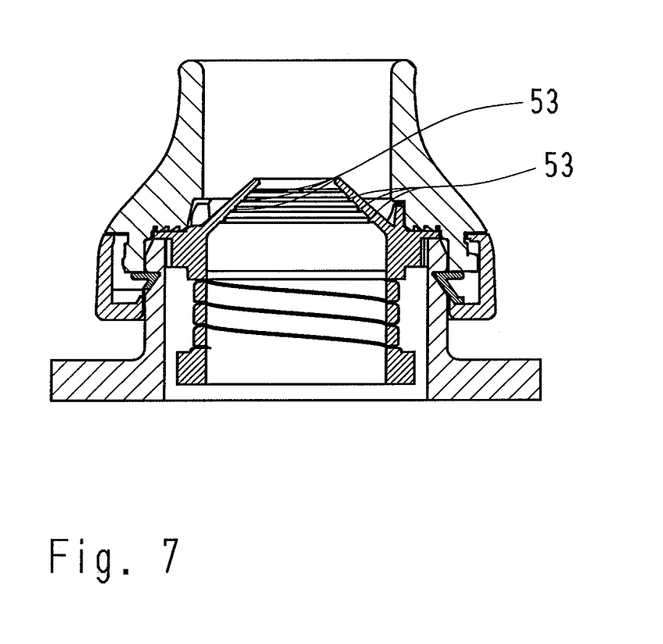

FIG. 7 shows all the components of the device working together for fixing, sealing and strain relief of a cable to be connected to a cable outlet connector of a connector box, switch cabinet, or the like.

Figure 8:
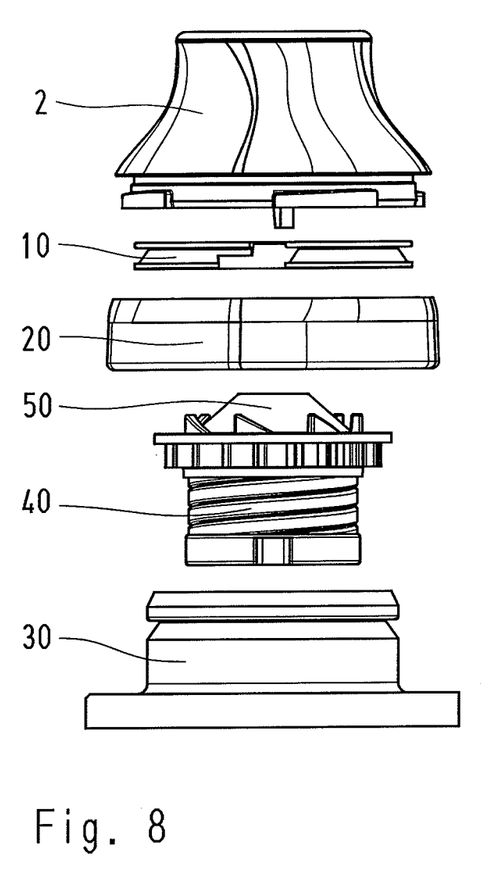

FIG. 8 shows an exploded view of the components of FIG. 7.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific example disclosed or the exact construction and operation shown and described. Rather, all suitable modifications and equivalents may be resorted to, falling within the scope of the invention.

REFERENCE LIST

Device for Securing a Cable to a Cable Outlet Connector

| | |
|---|---|
| 1 | Device for fixing the cable |
| 2 | Clamping sleeve |
| 3 | Supporting contour |
| 4 | Elongated webs |
| 5 | Cable opening |
| 6 | Driving contour (inside) |
| 7 | Circumferential ledge |
| 10 | Spring element |
| 11a, 11b | Two-stage first end of spring element |
| 12 | Second end of spring element |
| 13 | Ledge |
| D | Diameter |
| D1 | Minimum diameter |
| D2 | Maximum diameter |
| 20 | Locking ring |
| 21 | Driving contour |
| 22 | Recess |
| 23 | Elongated web |
| 24 | Bottom ring |
| 25 | Contour |
| 30 | Cable outlet connector |
| 31 | Circumferential groove |
| 32 | Base surface |
| 33 | Recesses |
| 34 | Locking contours |
| 40 | Strain relief element |
| 41 | Contour |
| 40a | First end |
| 40b | Second end |
| 42 | Helical or spiral-shaped structure |
| 42a | Right-handed spiral structure |
| 42b | Left-handed spiral structure |
| 43 | Latching hooks |
| 44 | Driving hooks |
| 50 | Sealing element |
| 51 | Opening |
| 52 | Pressing lamellae |
| 53 | Sealing lamellae |

The invention claimed is:

1. A device for fixing a cable to a cable outlet connector (30), comprising a clamping sleeve (2), a spring element (10) and a locking ring (20), whereby the spring element (10) is designed as an open ring characterized in that ends (11b, 12) of the spring element (10) are clamped between a supporting contour (3) of the clamping sleeve (2) and a driving contour (21) of the locking ring (20), while the spring element (10) is variable in diameter (D) by means of a relative movement of the locking ring (20) with respect to the clamping sleeve (2).

2. The device according to claim 1 characterized in that the locking ring (20) has two end positions and, on rotation of the locking ring (20) to said two end positions, the diameter (D) of the spring element (10) has a maximum diameter (D2) or a minimum diameter (D1) size.

3. The device according to claim 2 characterized in that at the minimum diameter (D1), an inner side of the spring element (10) fits precisely into a circumferential groove (31) of the cable outlet connector (30) so that the clamping sleeve (2) is held captive on the cable outlet connector (30).

4. The device according to claim 3 characterized in that at the maximum diameter (D2), the inner side of the spring element (10) emerges from the circumferential groove (31) of the cable outlet connector (30) so that the clamping sleeve (2) is removable from the cable outlet connector (30).

5. The device according to claim 1 characterized in that an inner side of the annular spring element (10) is conically-shaped.

6. The device according to claim 1 characterized in that an area of the supporting contour (3) of the clamping sleeve (2) and a surface of the driving contour (21) of the locking ring (21) that are respectively direct to the ends (11b, 12) of the spring element (10), are beveled in such a way that the ends (11b, 12) of the spring element (10) can be guided radially inwards or outwards on rotation of the locking ring (20).

7. The device according to claim 1 characterized in that the clamping sleeve (2) has radial webs (4) that can be inserted axially in recesses (22) of the locking ring (20), whereby during relative moment of the locking ring (20) with respect to the clamping sleeve (2), the webs (4) work with radial webs (23) of the locking ring (20) so that the clamping sleeve (2) and the locking ring (20) are clamped together.

* * * * *